United States Patent
Boyle et al.

(10) Patent No.: US 7,702,601 B2
(45) Date of Patent: Apr. 20, 2010

(54) RECOMMENDING SOLUTIONS WITH AN EXPERT SYSTEM

(75) Inventors: Peter C. Boyle, Burnaby (CA); Alexander K. MacAulay, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 11/636,039

(22) Filed: Dec. 7, 2006

(65) Prior Publication Data

US 2007/0143239 A1 Jun. 21, 2007

(30) Foreign Application Priority Data

Dec. 20, 2005 (CA) .................................. 2530928

(51) Int. Cl.
*G06N 5/00* (2006.01)
(52) U.S. Cl. .................. 706/45; 706/11; 706/46; 706/47; 706/48; 706/62; 707/1; 707/3; 707/6
(58) Field of Classification Search .................. 706/11, 706/14, 19, 45–50, 55, 60; 707/1–6; 705/7–11, 705/26–45
See application file for complete search history.

(56) References Cited

U.S. PATENT DOCUMENTS

| 5,822,743 | A * | 10/1998 | Gupta et al. .................. 706/50 |
| 6,604,141 | B1 * | 8/2003 | Ventura ....................... 709/227 |
| 6,701,311 | B2 * | 3/2004 | Biebesheimer et al. ......... 707/5 |
| 6,741,975 | B1 * | 5/2004 | Nakisa et al. ................. 706/47 |
| 6,882,825 | B2 | 4/2005 | Hopkins et al. |
| 7,256,708 | B2 * | 8/2007 | Rosenfeld et al. ...... 340/870.01 |
| 7,376,576 | B2 * | 5/2008 | Dimitruk et al. ............... 705/7 |
| 2002/0107824 | A1 * | 8/2002 | Ahmed ....................... 706/46 |
| 2002/0133384 | A1 * | 9/2002 | Dimitruk et al. ............... 705/7 |
| 2003/0158468 | A1 * | 8/2003 | Iliff ........................... 600/300 |
| 2004/0015386 | A1 * | 1/2004 | Abe et al. ..................... 705/10 |
| 2004/0133487 | A1 * | 7/2004 | Hanagan et al. ............... 705/34 |

FOREIGN PATENT DOCUMENTS

WO WO 02/086705 A1 10/2002
WO WO 2005/013162 A1 2/2005

* cited by examiner

*Primary Examiner*—David R Vincent
*Assistant Examiner*—Omar F Fernandez Rivas
(74) *Attorney, Agent, or Firm*—Ronald Kaschak; Hoffman Warnick LLC (57) ABSTRACT

An expert system is used to recommend a customized solution for a customer. The expert system includes a set of scenarios each of which includes default facts and is associated with a detailed rule base that when applied in isolation to the default facts fully determines a prototype solution. A particular scenario is selected from the set based at least on user input. A customized solution is generated by applying the detailed rule base associated with the particular scenario to facts based at least on the user input and any default facts of the particular scenario that complement and do not conflict with the facts that are based at least on the user input. The customized solution is iteratively refined.

14 Claims, 7 Drawing Sheets

RECOMMENDING SOLUTIONS WITH AN EXPERT SYSTEM

TECHNICAL FIELD OF THE INVENTION

The invention is related to the technical field of expert systems.

BACKGROUND OF THE INVENTION

In many areas of the business world, companies dedicate resources to support and sell to large customers. Although interested in meeting the needs of small and medium-sized customers, these companies may decide that it is not cost-effective to dedicate the same or similar resources to support and sell to them.

If the numbers of products, services and customization options offered by a particular company are relatively small, it is sometimes sufficient for the company to provide prospective and returning customers with a searchable catalog of offerings or a similar, relatively straightforward tool. A human representative of the company may be made available if the customer needs some guidance and clarifications.

If a company has a vast portfolio of offerings, it may be a complex task to assess which of the offerings provides a solution to the needs of a customer.

SUMMARY OF THE INVENTION

An expert system is used to recommend a customized solution for a customer. The expert system includes a set of scenarios, each of which includes default facts and is associated with a detailed rule base that when applied in isolation to the default facts fully determines a prototype solution. A particular scenario is selected from the set based at least on user input. A customized solution is generated by applying the detailed rule base associated with the particular scenario to facts based at least on the user input and any default facts of the particular scenario that complement and do not conflict with the facts that are based at least on the user input. The customized solution is iteratively refined.

BRIEF DESCRIPTION OF THE DRAWINGS

Embodiments of the invention are illustrated by way of example and not limitation in the figures of the accompanying drawings, in which like reference numerals indicate corresponding, analogous or similar elements.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

A company may employ a computerized expert system to handle the process of recommending solutions for customers based on its offerings. The expert system may be able to interact with one or more representatives ("users") of the customer and may include knowledge bases and reasoning mechanisms to guide the users through the process of recommending a solution. Throughout the description and claims, the term "user" is intended to refer to any representative of the customer. Different people may take on the role of the user at different stages of the process. The customer may be an existing customer of the company or a prospective customer. The customer may be an internal customer, i.e. the customer may be part of the company. The company may be a non-commercial and/or non-profit organization. The company may be a governmental agency. The offerings may be free of charge.

The expert system may involve a potentially large set of scenarios. For example, an expert system employed by IBM (International Business Machines) Corporation may include scenarios about its servers and workstations, scenarios about its regulatory content services for life sciences, scenarios about its expense management tools, and many more. In another example, an expert system employed by a telephone company may include scenarios about private branch exchange (PBX) switches, scenarios about call management features such as call waiting and caller ID, scenarios about fiber optics to connect large organizations such as universities, and many more.

Figure 1:
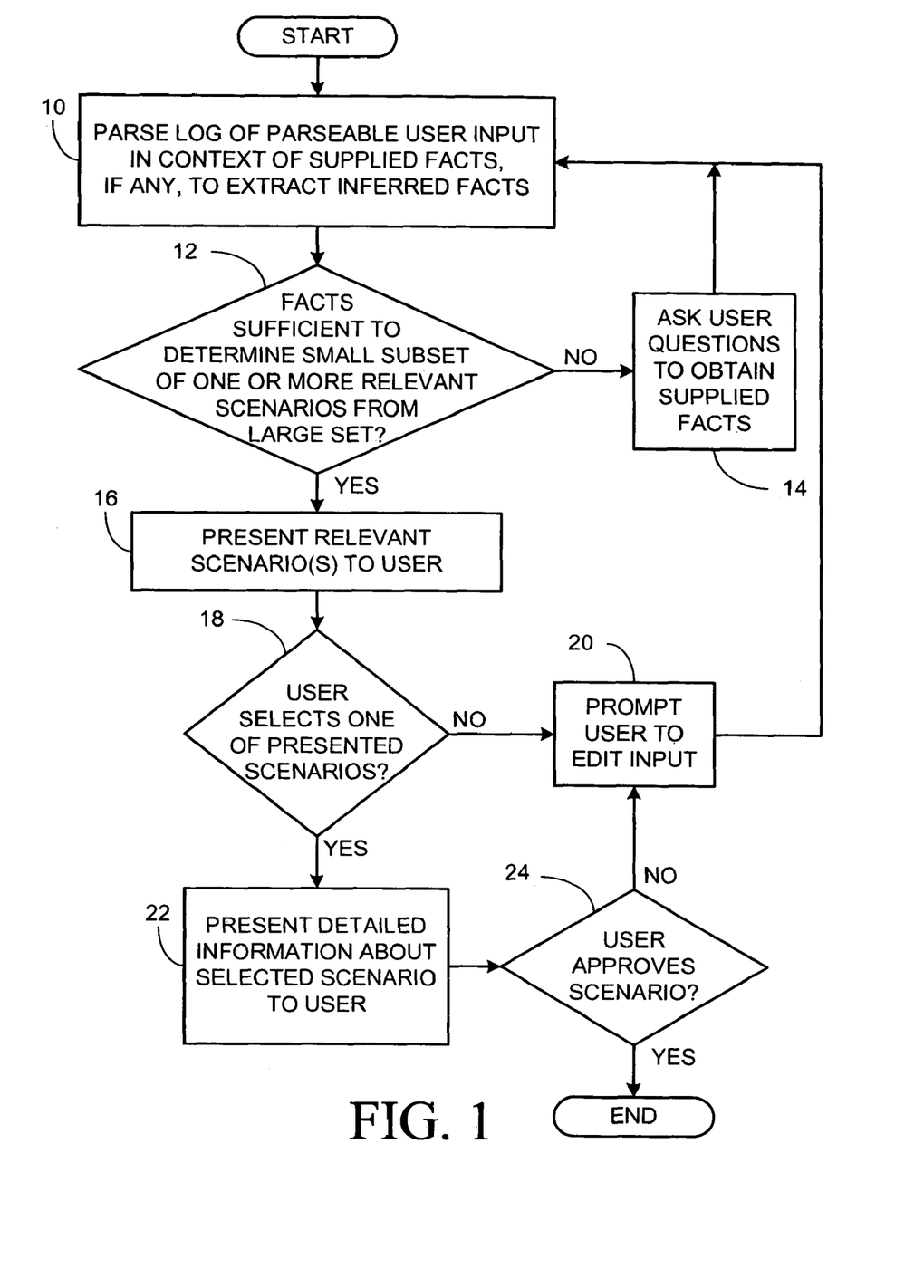
FIG. 1 is a flowchart of an exemplary method for scenario selection.
Figure 2:
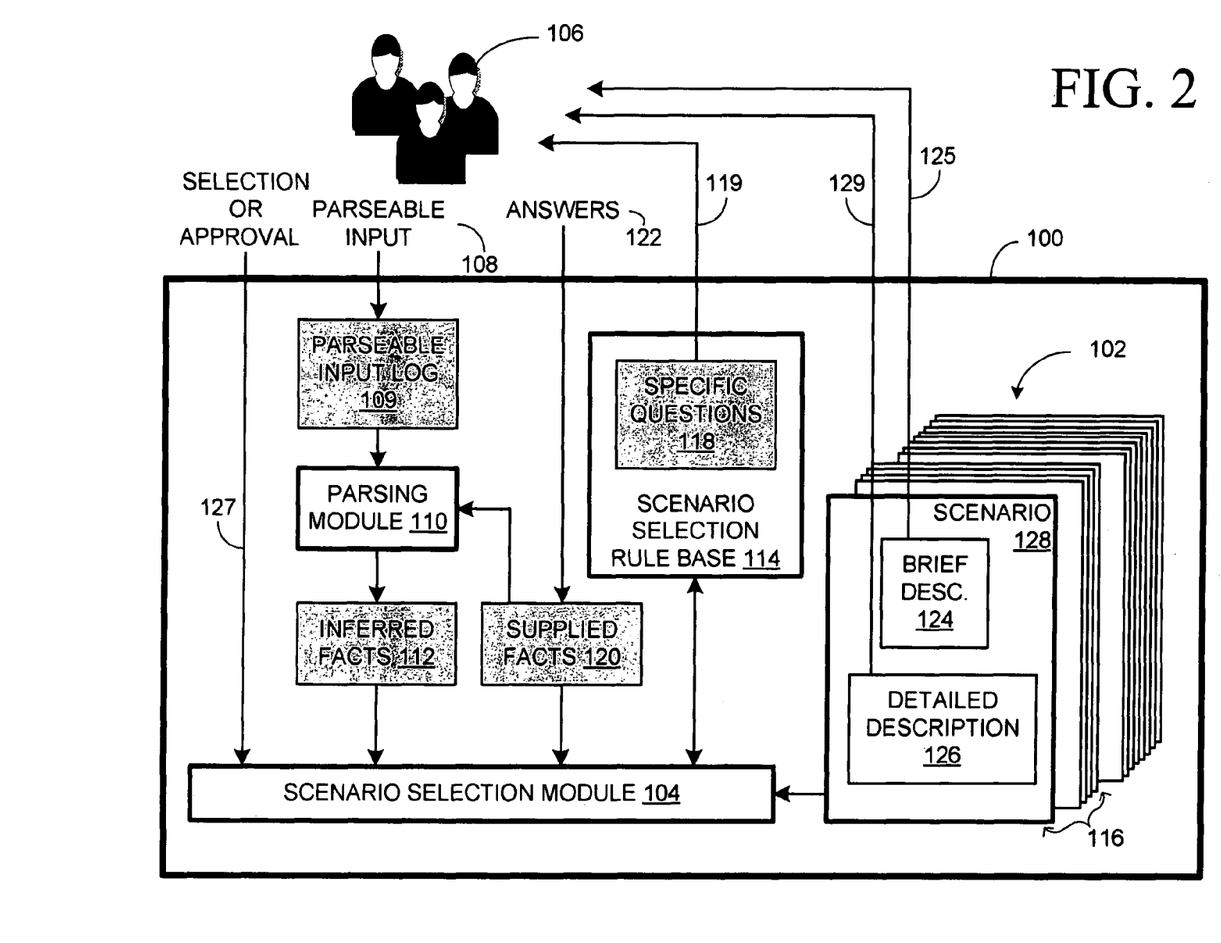
FIG. 2 is an architectural diagram of an exemplary expert system and its interaction with one or more users.

The process of recommending a solution therefore begins with a scenario selection process to identify a scenario that is relevant to the customer's situation. FIG. 1 is a flowchart of an exemplary simplified method for scenario selection, according to an embodiment of the invention. FIG. 2 is a simplified architectural diagram of an exemplary expert system 100 and its interaction with one or more users, according to some embodiments of the invention.

Expert system 100 involves a potentially large set 102 of scenarios and includes a scenario selection module 104 that implements all or a portion of the method of FIG. 1.

A user 106 provides parseable input 108 to expert system 100, which stores it in a parseable input log 109. Log 109 may already include parseable input about previous interactions of the customer with the company and/or specifically with expert system 100. Alternatively, this information about previous interactions may be introduced into expert system 100 in a different manner. Parseable input 108 may describe a need or problem and/or an anticipated solution to the need or problem. A parsing module 110 of expert system 100, or alternatively one or more external hardware and/or software modules accessed by expert system 100, parses log 109 in the context of supplied facts (defined below), if any, to extract inferred facts 112 (10).

In the telephone company example, a first user may provide the text "I want to get rid of prank or obscene calls". The inferred facts may include that the user is an existing customer of the telephone company. A second user may provide the text "I want to be able to transfer calls between employees". The inferred facts may include that the user represents a business.

In an Internet services company example, a user may provide the text "a high-volume website". The inferred facts may include that the user has an existing website and is knowledgeable about content and delivery. Another user may provide the text "I want help increasing the privacy of my payroll system". The inferred facts may include that this business already has a sophisticated computer system and knowledgeable personnel.

Parseable input may be provided to expert system 100 using free-form text, voice, scanning, predefined formatted spreadsheets, information gleaned from documents or any other suitable method, and expert system 100 may interact with any required hardware or software to receive and parse the input.

Using a scenario-selection rule base 114, scenario selection module 104 will determine whether the facts thus far are sufficient to identify a subset 116 of one or more potentially relevant scenarios, where the number of potentially relevant scenarios in the subset is small enough to enable their presentation to the user (12). For example, expert system 100 may implement a decision tree reasoning mechanism to use scenario-selection rule base 114.

If the facts thus far are insufficient, then scenario selection module 104 will ask user 106 specific questions 118, as shown by arrow 119, to obtain supplied facts 120 from the answers 122 to the specific questions (14). The specific questions are posed so that they must be answered unambiguously. For example, the user may answer a specific question by selecting an appropriate radio button, by entering a value in a numeric entry field, by checking one or more boxes, by adjusting sliders, by dragging lines up and down on a graph, or by choosing one or more items from a list. Scenario selection module 104 may lend greater significance to supplied facts 120 than to inferred facts 112, and a supplied fact 120 may even override an inferred fact 112.

In the Internet services company example, the user may be asked "How many users do you currently support?" and "Is your current solution hosted or does your organization manage it itself? Is it an intranet/extranet/Internet site? Does it now support e-commerce or will it need to in the near future?".

Using scenario-selection rule base 114, scenario selection module 104 will determine whether the facts thus far—inferred 112 and supplied 120—are sufficient to identify a subset 116 of one or more potentially relevant scenarios, where the number of potentially relevant scenarios in the subset is small enough to enable their presentation to user 106 (12). If the facts thus far are sufficient, the expert system will present brief descriptions 124 of the one or more potentially relevant scenarios to user 106, as shown by arrow 125 (16).

In the Internet services company example, the potentially relevant scenarios may include website design scenarios, e-commerce scenarios, and web hosting scenarios.

If user 106 indicates, as shown by arrow 127, that none of the presented scenarios is suitable (18), then in order to better understand the customer's situation expert system 100 may prompt user 106 to edit log 109 (20), and the method may resume from parsing log 109 in the context of supplied facts 120 (10). Any supplied facts 120 gathered thus far are retained and used by scenario selection module 104.

If, as shown by arrow 127, user 106 selects one of the presented scenarios (18), say scenario 128, expert system 100 may present a detailed description 126 of the selected scenario 128 to the user, as shown by arrow 129 (22). For example, detailed description 126 may include a textual description of the problem that scenario 128 addresses, a textual description of a prototype solution provided by scenario 128, and quantitative information about the prototype solution such as its cost and the timeframe.

If the user approves the selected scenario (24), the method ends. If the user does not approve the selected scenario (24), then in order to better understand the customer's situation expert system 100 may prompt user 106 to edit log 109 (20), and the method may resume from parsing log 109 in the context of supplied facts 120 (10).

According to some embodiments of the invention, the scenario selection process may be halted as many times as needed by the customer to, for example, gather information and knowledge or to involve users with different set of skills. No information or data is lost while the process is halted and the process may resume from the point at which it was halted.

Expert system 100 may be able to interact, if needed, with one or more persons designated as subject matter experts (SMEs) of the company. In general, the SMEs may be able to modify and enhance the knowledge bases and reasoning mechanisms to resolve immediate issues and to increase the expert system's ability to independently handle the process of recommending solutions for customers. In some embodiments, if the scenario selection process, an example of which is described above with respect to FIGS. 1 and 2, does not converge, one or more SMEs may become involved. For example, an SME may alter scenario-selection rule base 114. In another example, the SME may adjust the inferred facts 112 and/or the supplied facts 120 in order to resolve inconsistencies therebetween. In yet another example, the SME may modify or add scenarios to set 102. If required, a SME may interview one or more representatives of the customer.

According to some embodiments of the invention, the scenario selection process may be halted by the company if needed, for example, to provide an SME time to perform tasks and/or to involve SMEs with different set of skills. No information or data is lost while the process is halted and the process may resume from the point at which it was halted.

The state of a session with the expert system at the point at which the scenario selection process was halted may be saved and stored by the user and/or the system. It may be possible to compare the differences in the state of a session halted at different points in time.

Figure 3:
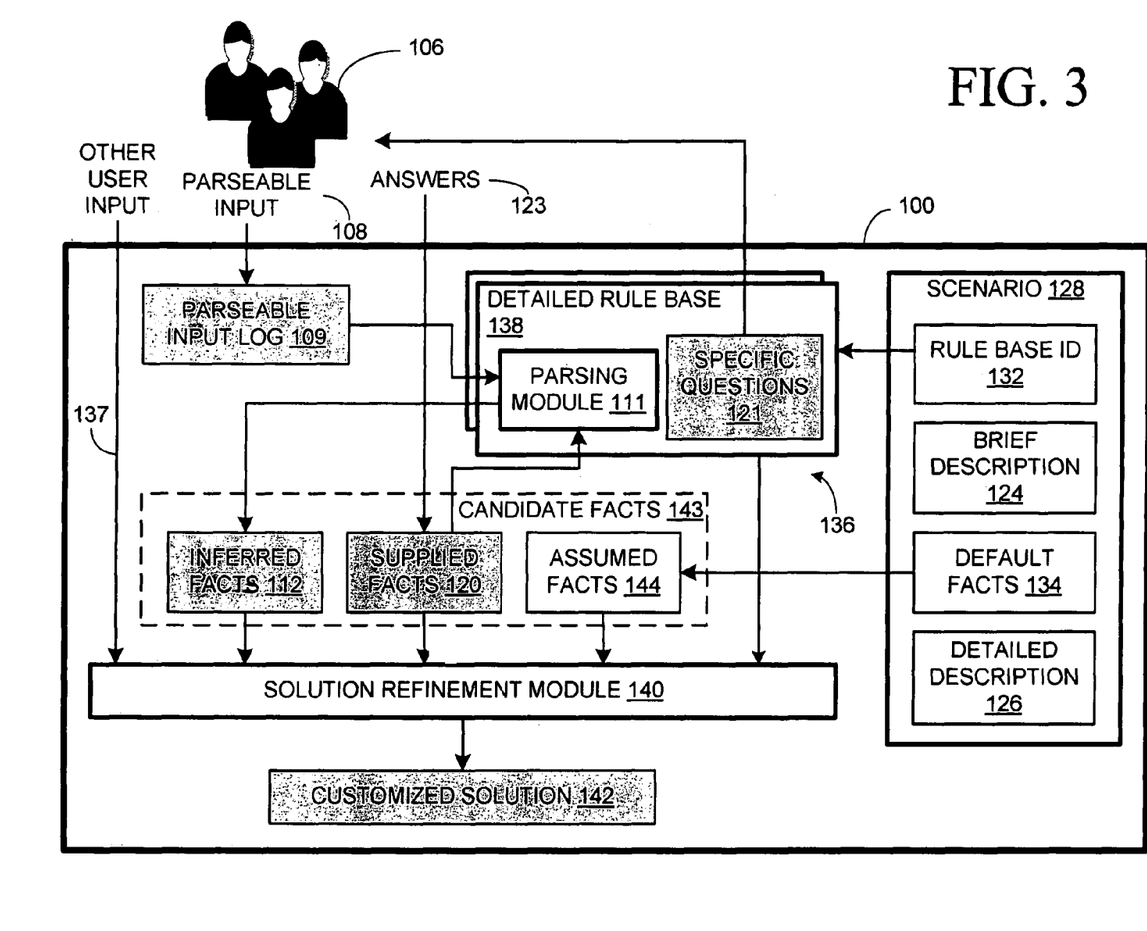
FIG. 3 is another architectural diagram of the exemplary expert system of FIG. 2 and its interaction with one or more users.

FIG. 3 is another simplified architectural diagram of exemplary expert system 100 and its interaction with one or more users, according to some embodiments of the invention. For clarity, certain components and/or elements of expert system 100 shown in FIG. 2 are not shown in FIG. 3. Moreover, expert system 100 may include components and/or elements that are not shown in either FIG. 2 or FIG. 3.

Selected scenario 128 includes:
a) brief description 124 and detailed description 126;
b) an identification 132 of a detailed rule base that applies to this scenario; and
c) a set of default facts 134.

When the identified detailed rule base is applied in isolation to the complete set of default facts 134, this fully determines a prototype solution that is based on the company's offerings and possibly also external offerings such as those provided by business partners or the community at large.

Other scenarios in set 102 may include corresponding information.

Expert system 100 includes one or more detailed rule bases 136. A particular detailed rule base may be applicable to more than one scenario; however each scenario has a single detailed rule base applicable thereto. The detailed rule base identified by identification 132 is referenced 138. Any other manner of associating scenarios and detailed rule bases is also possible. Detailed rule base 138 includes a parsing module 111 and specific questions 121. Parsing module 111 is able to generate inferred facts 112 from log 109 in the context of supplied facts 120. Answers 123 to specific questions 121 are stored by expert system 100 as additional supplied facts 120.

The prototype solution that would be determined by applying detailed rule base 138 in isolation to default facts 134 may not be appropriate for the customer. Moreover, it does not take into account the inferred facts 112 and supplied facts 120 obtained from the scenario selection process. Once a scenario has been selected, the process of recommending a solution continues with a solution refinement process to generate a customized solution to suit the customer.

There is more than one possible route to the final customized solution. In the Internet services company example, the scenario selection process may result in the selection of a website design scenario, but the solution refinement process may bring elements of e-commerce into the final customized solution. Alternatively, the scenario selection process may result in the selection of an e-commerce scenario, but the solution refinement process may bring elements of web design into the final customized solution.

Figure 4:
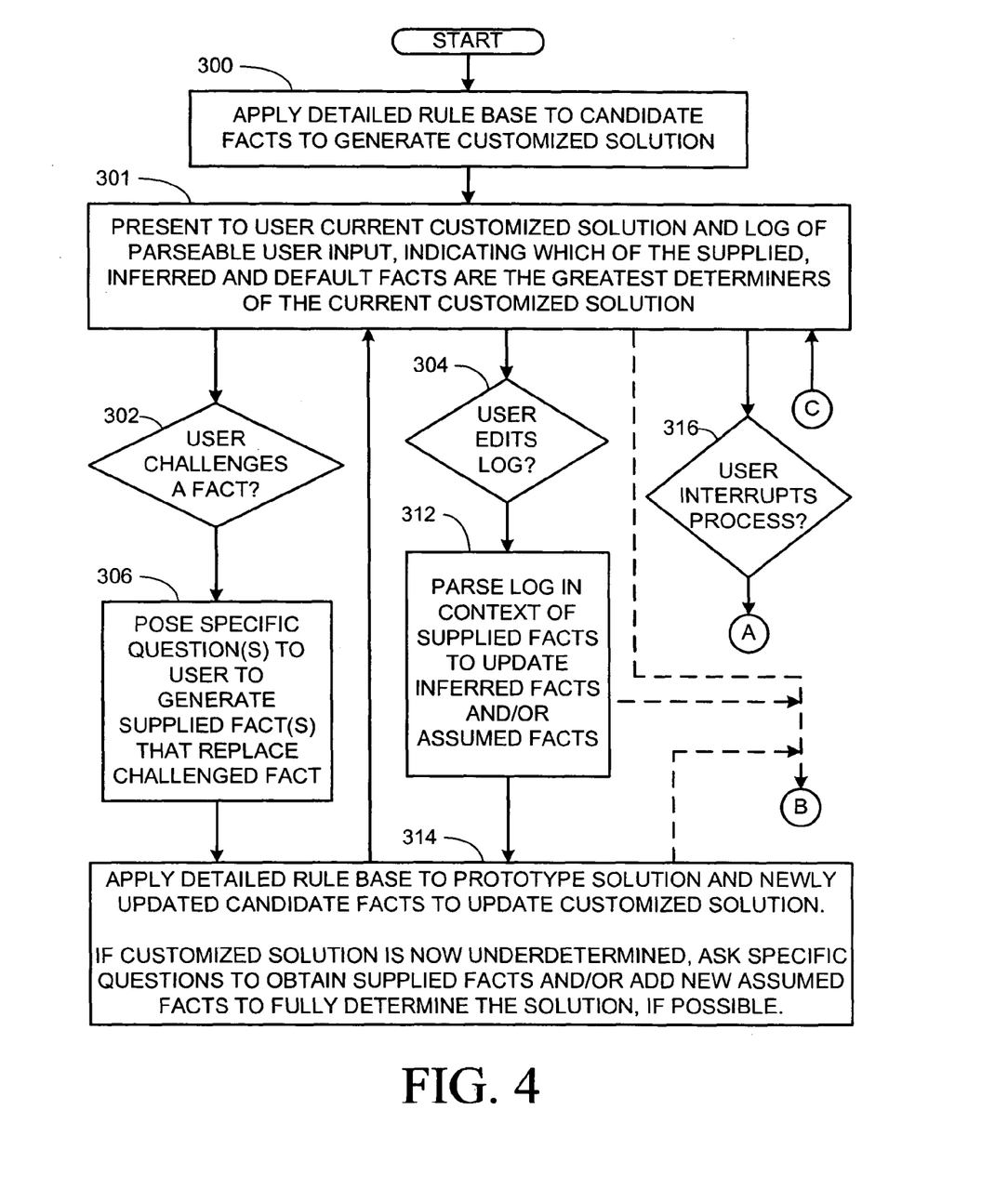
FIGS. 4-6 are a flowchart of an exemplary method for a solution refinement process.
Figure 5:
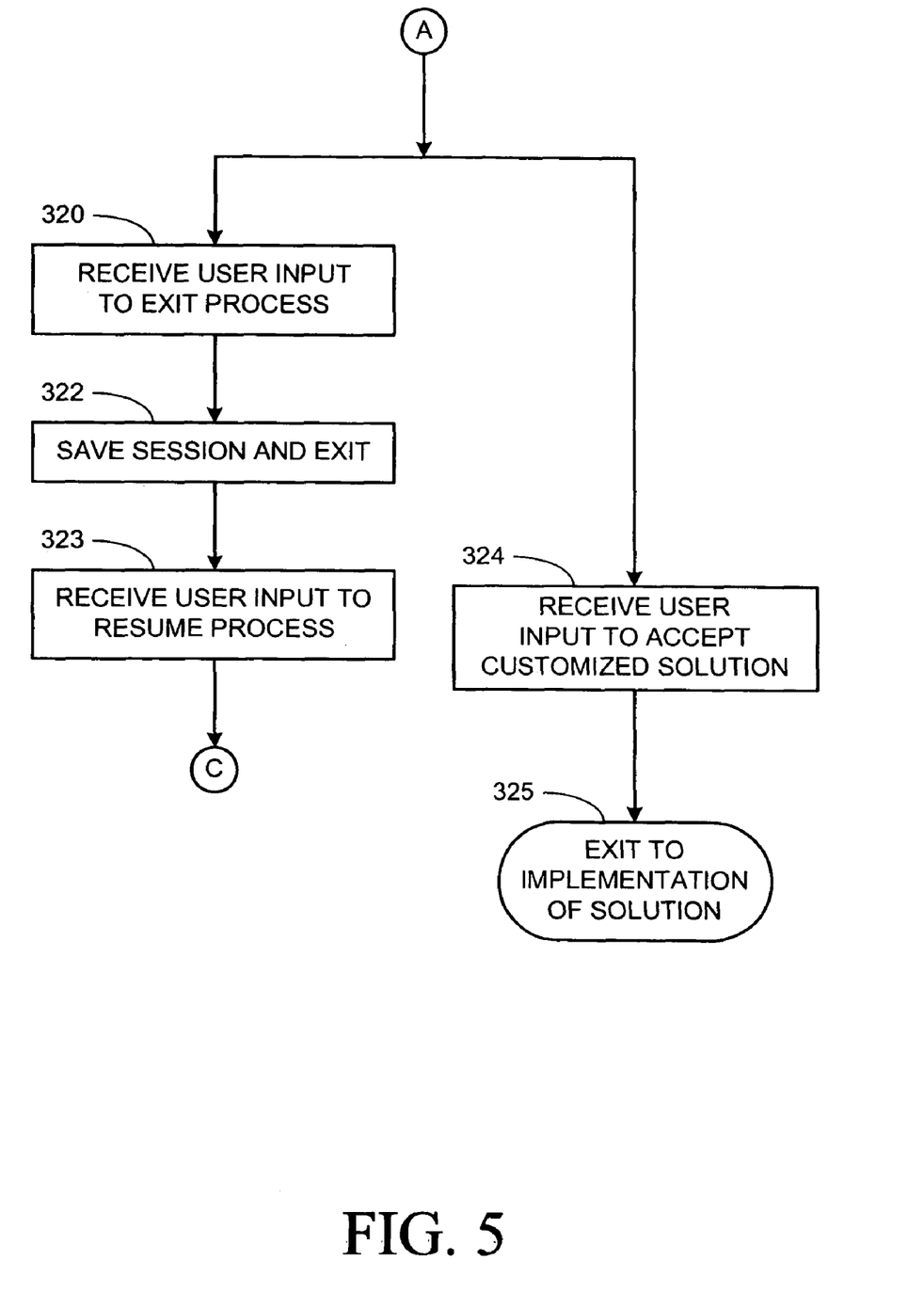
Figure 6:
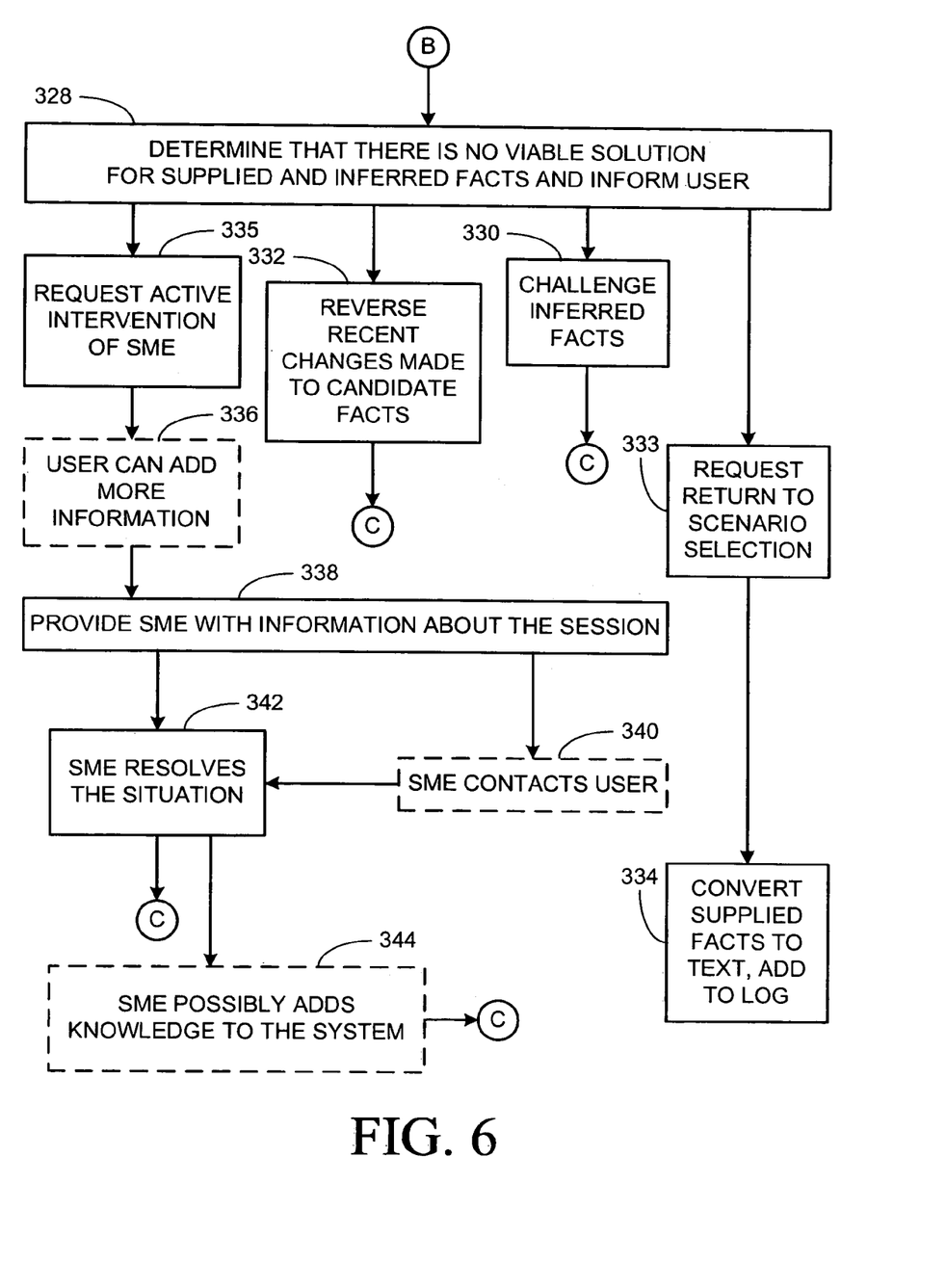

FIGS. 4-6 are a flowchart of an exemplary simplified method for solution refinement, according to an embodiment of the invention. Expert system 100 includes a solution refinement module 140 that implements all or a portion of the method of FIGS. 4-6. Solution refinement module 140 may use a backward chaining rules engine.

Solution refinement module 140 generates a customized solution 142 by applying detailed rule base 138 to a set of candidate facts 143 (300). Candidate facts 143 comprise inferred facts 112, supplied facts 120, and assumed facts 144. The assumed facts 144 are those default facts 134 that complement and do not conflict with inferred facts 112 and supplied facts 120. Customized solution 142 is the starting point of the solution refinement process.

Expert system 100 presents user 106 with customized solution 142 and with the contents of log 109, which includes all parseable input received from the user up to that point (301). Expert system 100 may also present user 106 with candidate facts 143 and indicate which of these facts were most significant in determining customized solution 142. Since log 109 may be very lengthy, it is likely that expert system 100 will highlight or abstract or otherwise identify those passages of log 109 from which the inferred facts 112, or only the most significant ones, were determined.

Upon reviewing this information, user 106 may decide to challenge any of candidate facts 143 (302) and/or to edit log 109 (304). If user 106 decides to challenge a fact, user 106 may delete the challenged fact, or one or more specific questions 119 from detailed rule base 138 may be posed to user 106 to generate one or more supplied facts 120 that replace the challenged fact (306). If user 106 decides to edit log 109, parsing module 111 may reanalyze log 109 in the context of supplied facts 120 to update inferred facts 112 and/or assumed facts 144 (312).

If candidate facts 143 have changed at 306 or 312, solution refinement module 140 may apply detailed rule base 138 to newly updated candidate facts 143 to update customized solution 142 (314). If customized solution 142 is now underdetermined, solution refinement module 140 may add new assumed facts 144 from default facts 134 and/or from detailed rule base 138 to candidate facts 143 to fully determine customized solution 142, if possible (314). The method may then resume from 301.

User 106 may interrupt the solution refinement process at any time (316). For example, user 106 may decide to exit the process and probably to continue later (320). In that case, expert system 100 may save the current state of the solution refinement process and exit (322), and when user 106 indicates that the process is to be resumed (323), the method may then resume from 301 of FIG. 4. In yet another example, user 106 may indicate acceptance of customized solution 142 (324), and the method may exit to another process of implementation of customized solution 142 (325).

As shown in FIG. 4 by dashed arrows, which lead to FIG. 6, at various points in the solution refinement process, solution refinement module 140 may determine that there is no viable solution for supplied facts 120 and inferred facts 112 (328) and may inform user 106 of this. According to the input from user 106, the method may continue in one of four options (presented in no particular order).

With the first option, expert system 100 may challenge one or more inferred facts 112 (330). Expert system 100 may request guidance from user 106 with this challenge, perhaps in the form of posed specific questions. For example, expert system 100 may discard one or more inferred facts 112 and/or may upgrade one or more inferred facts 112 to the status of a supplied fact if user 106 confirms the inferred fact 112. The method may then resume from 301 of FIG. 4.

With the second option, expert system 100 may reverse recent changes made to candidate facts 143 (332) and the method may then resume from 301 of FIG. 4. Alternatively, with user guidance, expert system 100 may revert back to a saved version of the session and the method may then resume from the point at which the saved version of the session was halted.

With the third option, user 106 may request to return to the scenario selection process (333). Expert system 100 may convert supplied facts 120, or possibly only those of supplied facts 120 that result from answers 123 to specified questions 121 of detailed rule base 138, to text and add them to log 109 (334). Then the method may continue to FIG. 1.

With the fourth option, user 106 may request the intervention of one or more SMEs in the process (335). User 106 may optionally add information, for example, free-form text (336). Expert system 100 may transfer information about the session to one or more SMEs (338). For example, expert system 100 may transfer the full content of the session.

The one or more SMEs may optionally contact user 106 or other representatives of the customer to receive information and clarifications (340). The SMEs may apply changes to components of expert system 100 so it can generate a viable customized solution 142 (342). The method may then resume from 301 of FIG. 4. The SMEs may optionally apply knowledge gathered in the session to components of expert system 100 for future use (344).

Scenario selection module 104 and solution refinement module 140 may be implemented in hardware, software, or any suitable combination thereof. A non-exhaustive list of examples for software includes firmware, resident software, microcode and the like. Furthermore, embodiments of the invention can take the form of a computer program product accessible from a computer-usable or computer-readable medium providing program code for use by or in connection with a computer or any instruction execution system. For the purpose of this description, a computer-useable or computer-readable medium can be any apparatus that can contain, store, communicate, propagate or transport the program for use by or in connection with the instruction execution system, apparatus, or device.

The medium can be an electronic, magnetic, optical, infrared, radio waves, or semiconductor system (or apparatus or device) or a propagation medium. Examples of a computer-readable medium include a semiconductor or solid state memory, magnetic tape, a removable computer diskette, a rigid magnetic disk and an optical disk. Current examples of optical disks include compact disk—read only memory (CD ROM), compact disk—read/write (CD-R/W) and digital versatile disk (DVD).

Figure 7:
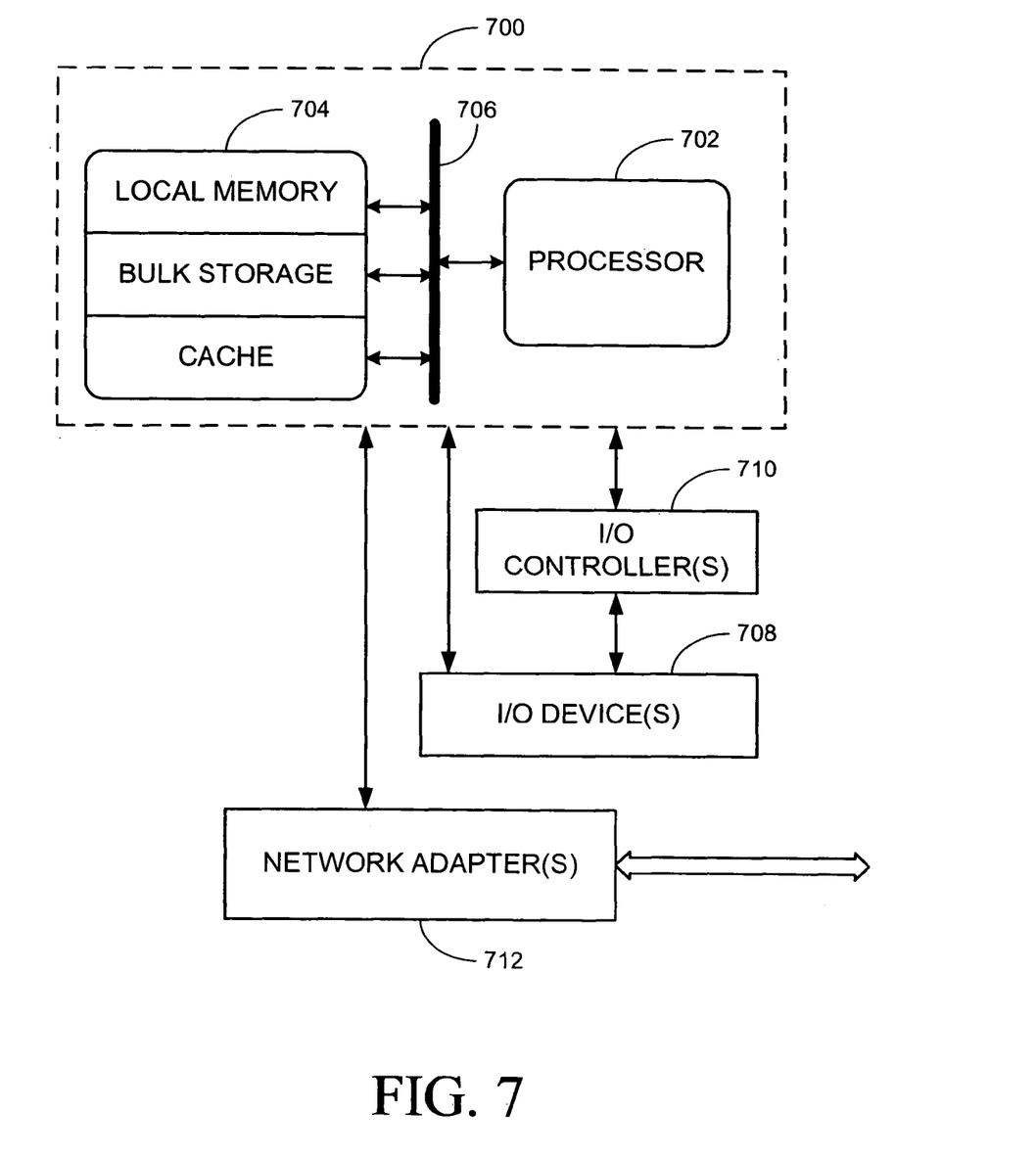
FIG. 7 is a block diagram of an exemplary computing apparatus.

FIG. 7 is a block diagram of an exemplary computing apparatus. Expert system 100 may be implemented in one or more types of computing apparatus, for example, in server computers. The SME may interact with expert system 100 via data terminals, which are examples of computing apparatus. The user may interact with expert system 100 via a personal computer and the Internet, or via a point of sale (POS), a kiosk machine, a self service kiosk machine, an information kiosk, a laptop computer, a desktop computer, a data terminal and the like.

A data processing system 700 suitable for storing and/or executing program code will include at least one processor 702 coupled directly or indirectly to memory elements 704 through a system bus 706. The memory elements 704 can include local memory employed during actual execution of the program code, bulk storage, and cache memories which provide temporary storage of at least some program code in order to reduce the number of times code must be retrieved from bulk storage during execution.

Input/output (I/O) devices 708—including but not limited to keyboards, displays, pointing devices, and the like—can be coupled to data processing system 700 either directly or through intervening I/O controllers 710.

Network adapters 712 may also be coupled to data processing system 700 to enable data processing system 700 to become coupled to other data processing systems or remote printers or storage devices through intervening private or public networks. Modems, cable modem and Ethernet cards are just a few of the currently available types of network adapters.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, executed on a computing device, for using an expert system to recommend a customized solution for a customer, the method comprising:
   providing in the expert system a set of scenarios each of which includes default facts and is associated with a detailed rule base that when applied in isolation to the default facts fully determines a prototype solution;
   selecting a particular scenario from the set of scenarios based at least on user input, wherein the selecting comprises:
   posing at least one specific question to a user who is a representative of the customer and obtaining supplied facts from answers to the questions;
   in a context of the supplied facts, inferring facts from parseable input supplied to the expert system;
   determining a subset of the scenarios from the inferred facts and the supplied facts; and
   enabling the user to select a particular scenario from the subset of the scenarios;
   generating a customized solution by applying the detailed rule base associated with the particular scenario to a set of candidate facts that comprises the inferred facts, the supplied facts, and assumed facts, where the assumed facts are any default facts of the particular scenario that complement and do not conflict with the inferred facts and the supplied facts
   iteratively refining the customized solution; and
   presenting the user with the customized solution and with a log of the parseable input supplied to the expert system; and
   indicating to the user which of the candidate facts are most significant in determining the customized solution.

2. The method of claim 1, further comprising:
   enabling the user to edit the parseable input; and
   revising the inferred facts according to the edited parseable input in the context of the supplied facts.

3. The method of claim 1, wherein iteratively refining the customized solution comprises:
   if the user challenges any of the candidate facts, updating the candidate facts by replacing each challenged fact with at least one supplied fact from answers to specific questions posed to the user; and
   refining the customized solution by applying the detailed rule base associated with the particular scenario to the updated candidate facts.

4. The method of claim 1, wherein iteratively refining the customized solution comprises:
   enabling the user to edit the log;
   updating the inferred facts and the assumed facts of the candidate facts in the context of the supplied facts and the edited log; and
   refining the customized solution by applying the detailed rule base associated with the particular scenario to the updated candidate facts.

5. The method of claim 1, further comprising:
   if the refined customized solution is underdetermined, posing additional specific questions to obtain additional supplied facts.

6. The method of claim 1, further comprising:
   if the refined customized solution is underdetermined, adding additional assumed facts to the set of candidate facts.

7. The method of claim 1, further comprising:
   if iteratively refining the customized solution does not converge to a final solution, obtaining input from a subject matter expert.

8. The method of claim 7, further comprising:
   revising the expert system with the input from the subject matter expert.

9. The method of claim 8, further comprising:
   inviting the user to resume iteratively refining the customized solution using the revised expert system.

10. A computer program product comprising a computer useable storage medium having computer readable executable modules comprising:
    a set of scenarios each of which includes default facts and is associated with a detailed rule base that when applied in isolation to the default facts fully determines a prototype solution;
    a scenario selection module to select a particular scenario from the set of scenarios based at least on user input, using a scenario selection rule base, wherein the scenario selection rule base comprises specific questions to be posed to a user, and wherein supplied facts are obtained from answers to the specific questions;
    a parsing module to parse parseable input in the context of the supplied facts and infer therefrom inferred facts; and
    a solution refinement module to generate a customized solution by applying the detailed rule base associated with the particular scenario to a set of candidate facts that comprises the inferred facts, the supplied facts, and assumed facts, where the assumed facts are any default facts of the particular scenario that complement and do not conflict with the inferred facts and the supplied facts and to iteratively refine the customized solution; and presenting the user with the customized solution and with a log of parseable input supplied to the expert system; and indicating to the user which of the candidate facts are most significant in determining the customized solution.

11. The computer program product of claim 10, wherein the scenario selection module includes a decision tree reasoning mechanism to use the scenario selection rule base.

12. The computer program product of claim 10, wherein the solution refinement module uses a backward chaining rules engine.

13. An expert system for recommending a customized solution for a customer, the expert system comprising:
   at least one computing device including:
      a set of scenarios each of which includes default facts and is associated with a detailed rule base that when applied in isolation to the default facts fully determines a prototype solution;
      a system for selecting a particular scenario from the set of scenarios based at least on user input, wherein the selecting comprises:
         posing at least one specific question to a user who is a representative of the customer and obtaining supplied facts from answers to the questions;
         in a context of the supplied facts, inferring facts from parseable input supplied to the expert system;
      determining a subset of the scenarios from the inferred facts and the supplied facts; and
      enabling the user to select a particular scenario from the subset of the scenarios;
         a system for generating a customized solution by applying the detailed rule base associated with the particular scenario to a set of candidate facts that comprises the inferred facts, the supplied facts, and assumed facts, where the assumed facts are any default facts of the particular scenario that complement and do not conflict with the inferred facts and the supplied facts a system for iteratively refining the customized solution; and presenting the user with the customized solution and with a log of the parseable input supplied to the expert system; and indicating to the user which of the candidate facts are most significant in determining the customized solution.

14. A method, executed on a computing device, for deploying an application for recommending a customized solution, using an expert system, for a customer, comprising:
   providing a computer infrastructure being operable to:
   provide in the expert system a set of scenarios each of which includes default facts and is associated with a detailed rule base that when applied in isolation to the default facts fully determines a prototype solution;
   select a particular scenario from the set of scenarios based at least on user input, wherein the selecting comprises:
   posing at least one specific question to a user who is a representative of the customer and obtaining supplied facts from answers to the questions;
   in a context of the supplied facts, inferring facts from parseable input supplied to the expert system;
   determining a subset of the scenarios from the inferred facts and the supplied facts; and
   enabling the user to select a particular scenario from the subset of the scenarios;
   generate a customized solution by applying the detailed rule base associated with the particular scenario to a set of candidate facts that comprises the inferred facts, the supplied facts, and assumed facts, where the assumed facts are any default facts of the particular scenario that complement and do not conflict with the inferred facts and the supplied facts
   iteratively refine the customized solution;
   presenting the user with the customized solution and with a log of the parseable input supplied to the expert system; and
   indicating to the user which of the candidate facts are most significant in determining the customized solution.

* * * * *